J. G. CALLAN.
VISCOSITY INDICATOR.
APPLICATION FILED MAY 10, 1916.
1,331,861.
Patented Feb. 24, 1920.
2 SHEETS—SHEET 1.
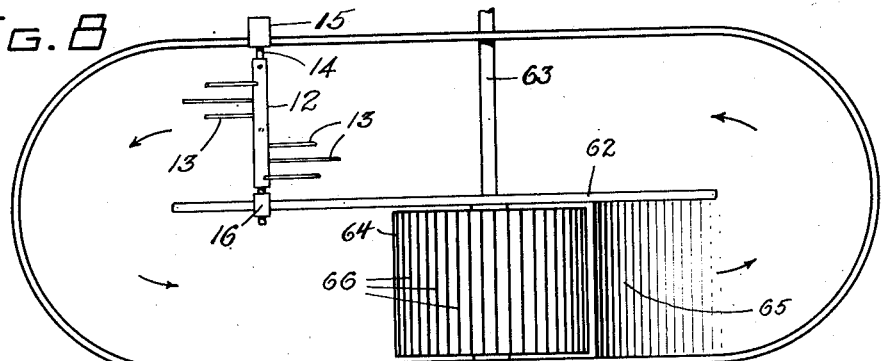
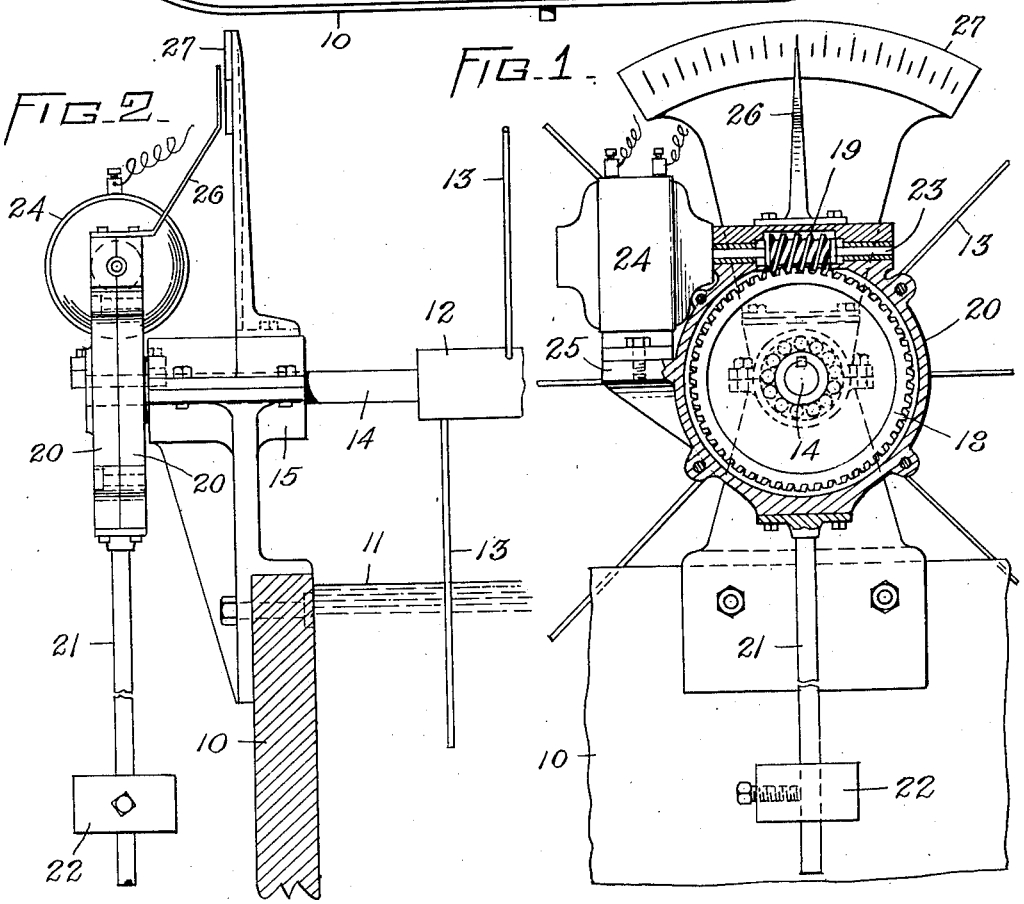
INVENTOR:
J. G. Callan
ATTYS.

J. G. CALLAN.
VISCOSITY INDICATOR.
APPLICATION FILED MAY 10, 1916.
1,331,861.
Patented Feb. 24, 1920.
2 SHEETS—SHEET 2.
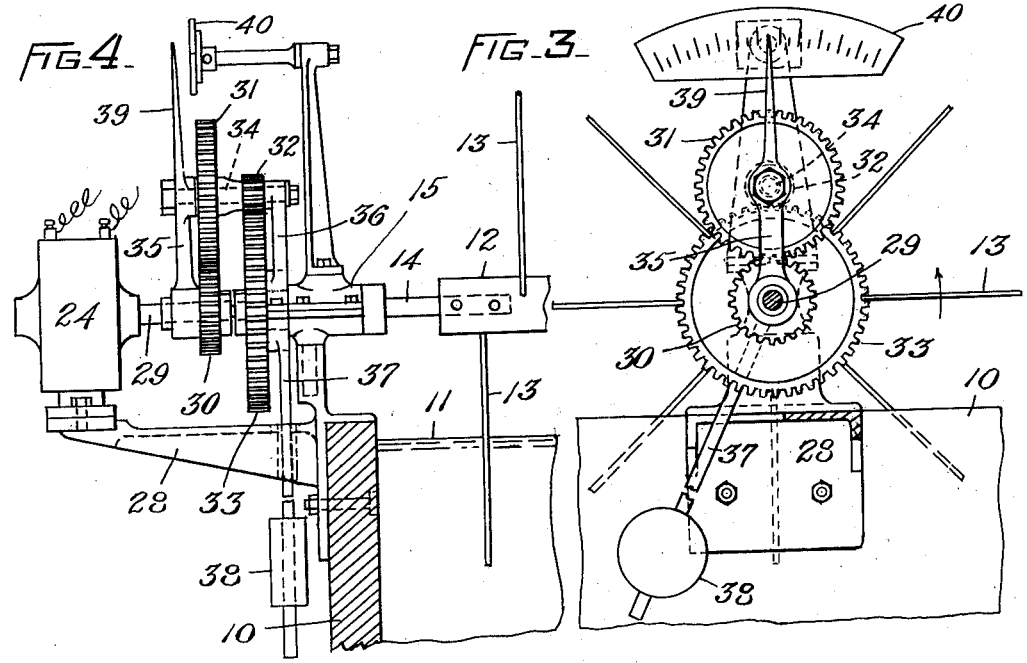
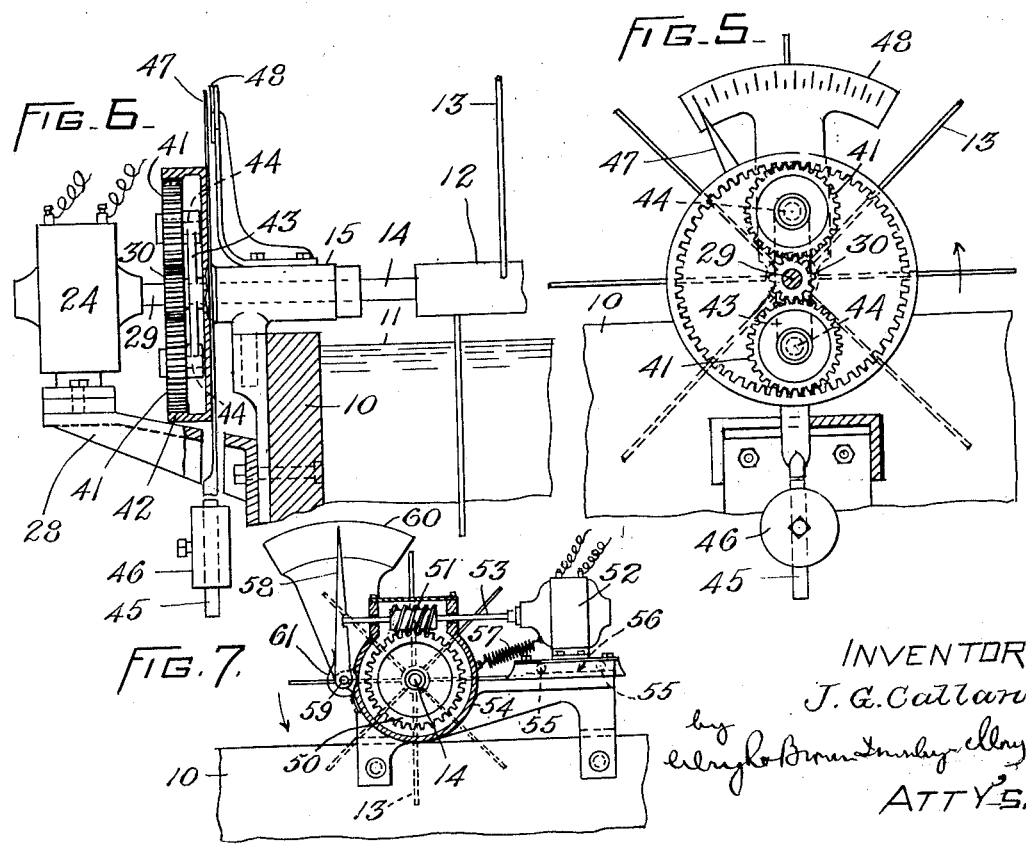
INVENTOR
J. G. Callan
ATTY'S.

UNITED STATES PATENT OFFICE.

JOHN G. CALLAN, OF NAHANT, MASSACHUSETTS, ASSIGNOR, BY MESNE ASSIGNMENTS, TO EASTERN MANUFACTURING COMPANY, OF BOSTON, MASSACHUSETTS, A CORPORATION OF MASSACHUSETTS.

VISCOSITY-INDICATOR.

1,331,861.  Specification of Letters Patent.  Patented Feb. 24, 1920.

Application filed May 10, 1916. Serial No. 96,570.

*To all whom it may concern:*

Be it known that I, JOHN G. CALLAN, a citizen of the United States, residing at Nahant, in the county of Essex and State of Massachusetts, have invented new and useful Improvements in Viscosity-Indicators, of which the following is a specification.

This invention relates to mechanism for measuring and indicating the viscosity of viscous substances, and its object is to provide more sensitive and accurate mechanism than any that has been provided hitherto for this purpose, especially for ascertaining the condition of "beater-stock" in the manufacture of paper and like materials.

It has been proposed to use a "drag" for ascertaining the viscous quality and for adjusting the measuring and indicating mechanism according to the degree of viscosity. A "drag" is a normally stationary element and it is immersed wholly or in part in the viscous substance, and in order to make use of it the viscous substance must be caused to flow past it at a predetermined speed. The extent of indicating movement imparted to the measuring and indicating mechanism is determined by the extent to which the "drag" is displaced from its normal position by the viscous substance, such displacement being opposed by a restoring element such as a spring or weight that tends continually to return the "drag" to normal position. Friction and inertia of the movable elements of the measuring and indicating mechanism render the latter less sensitive to variations of viscosity than if the "drag" or its equivalent, and the movable elements of the mechanism were continually in motion.

My improved indicator includes a continuously rotating element, hereinafter termed a "feeler," that takes the place of the "drag" hitherto used, and for this reason the indicator is capable of measuring and indicating the viscosity of immobile substances, although it is nevertheless capable of such measuring and indicating when the viscous substance is flowing. The mechanism that drives the feeler through the viscous substance is a part of the measuring and indicating mechanism, and is movable, otherwise than in a driving capacity, from a normal position, in response to the reactive effect of the viscous substance upon the feeler. A restoring element, such as a weight or spring, that has a cumulative force, is applied to the driving mechanism to counteract the reactive effect above mentioned, so that while the reaction of the substance tends to displace the driving mechanism from normal position, the counteraction of the restoring element tends to return said mechanism to normal position. The driving mechanism is utilized to adjust an indicating element according to the movement toward or from normal position necessary to balance the two opposing forces that tend continually to move it.

Of the accompanying drawings:

Figure 1 represents an elevation, partly in section, showing one form of indicating mechanism in the act of indicating, and mounted upon a portion of the tub or container in which the viscous substance is contained.

Fig. 2 represents an elevation of the said mechanism viewed in a direction at right angles to that of Fig. 1.

Fig. 3 is an elevation, partly in vertical section, of a modification embodying the invention. This figure corresponds to Fig. 1 as to the direction of view.

Fig. 4 is an elevation of the modification shown by Fig. 3, the direction of view corresponding to that of Fig. 2.

Fig. 5 represents an elevation, partly in section, of still another modification, showing the mechanism in normal position, the direction of view being similar to that of Figs. 1 and 3.

Fig. 6 is an elevation of the modification shown by Fig. 5, and is similar to Figs. 2 and 4 as to the direction of view.

Fig. 7 illustrates a fourth modification and is similar to Figs. 1, 3 and 5 as to the direction of view.

Fig. 8 represents a top plan view, on a smaller scale, of a beating machine used in the manufacture of paper, for beating the paper stuff.

The same reference characters indicate the same parts wherever they occur.

Referring first to the form shown by Figs. 1 and 2, the tub or container for the viscous substance is indicated at 10, and the viscous substance contained therein is indicated at 11. The feeler for ascertaining the viscosity of the substance 11 comprises, in the present instance, a hub 12 and a plurality of feeler fingers 13 radiating therefrom in different planes. This arrangement of the fingers enables them to ascertain the viscosity at as many different places in the substance 11, so that if the viscosity of the latter is not uniform the feeler will ascertain the average viscosity.

The feeler is carried by a rotatable shaft 14, and the latter is mounted in bearings 15 and 16. (See Fig. 8.) The feeler as shown by the drawings is the same in all modifications.

In the present instance the fingers 13 pass into and out of the substance 11 in consequence of rotating the feeler about a horizontal axis.

In the form shown by Figs. 1 and 2, a worm gear 18 is affixed to shaft 14 and is driven by a worm 19. This worm and gear are inclosed in a housing that comprises two complemental sections 20, 20 bolted or otherwise secured together. This housing is supported by shaft 14 and is capable of oscillatory motion. A pendulum rod 21 is affixed to the housing and is provided with an adjustable weight 22. The shaft 23 that carries the worm 19 is, in the present instance, the armature shaft of an electric motor 24. This motor is the prime mover and is preferably operated by alternating current, or, if by direct current, then the winding should be such as to give close speed regulation so that a predetermined speed may be insured to drive the feeler. As the feeler fingers are caused to impinge against the viscous substance the latter reacts more or less according to its degree of viscosity, and the rotation of the feeler is thus opposed. If the feeler is driven in an anti-clockwise direction, Fig. 1, the reaction of the viscous substance will cause the housing to swing in the opposite direction until the pendulum reaches an angular position where it counterbalances the degree of reactive force of the viscous substance. So long as the feeler is being driven through the viscous substance in the direction suggested, the worm tends to move the housing in the opposite direction, but such turning of the housing is opposed by the pendulum. Consequently the reactive force of the viscous substance is met continually by the sustaining force of the pendulum, the latter having a cumulative degree according to the distance it is displaced from normal position. A balance of the two opposing forces is thus maintained, and an indicating pointer 26 carried by the housing will occupy an angular position corresponding to the extent to which the housing is displaced from normal position by the reactive force of the viscous substance. If the viscous substance is undergoing a treatment or operation that diminishes its viscosity, the reactive force thereof will diminish and the pendulum will return the housing toward normal position in proportion to such diminution. A stationary scale element 27 is arranged to coöperate with the indicating pointer 26.

It is not necessary to mount the prime mover upon the counterbalancing element in order to obtain an indication of viscosity. For example, Figs. 3 and 4 show a modification in which the prime mover is stationary and in which the transmission means nevertheless utilizes the principle hereinbefore explained. In Fig. 4 the prime mover is indicated at 24. It is mounted upon a fixture 28. The armature shaft 29 carries a pinion 30, and the latter meshes with a gear 31. A pinion 32 is fastened to gear 31, and these two gears constitute what is commonly known as "back gearing." Pinion 32 meshes with gear 33 which is affixed to feeler shaft 14. Gears 31 and 32 are mounted upon a stud shaft 34. This shaft does not rotate, but connects swinging arms 35 and 36. Shafts 29 and 14 are concentric with relation to each other, and arms 35 and 36 are mounted respectively upon them, and are adapted to swing about them in response to the reactive force of the viscous substance. These arms and stud shaft 34 together form a rigid structure. A pendulum rod 37 and weight 38 are affixed to arm 36 and are, to all intents and purposes, the equivalent of the elements 21 and 22 in the form first described. An indicating pointer 39 is carried by arm 35 and is arranged to coöperate with a stationary scale element 40.

As the feeler is driven in the direction indicated by the arrow in Fig. 3, arms 35 and 36 and pointer 39 tend to move in the opposite direction in consequence of reactive force of the viscous substance, and the pointer is thus caused to traverse the scale element 40 until the pendulum has reached an angular position where its counterbalancing force is equal to the reactive force of the viscous substance. This form differs from that first described in that the position of the prime mover remains fixed and the position of the transmission means changes to afford a balance between the driving force and the resistant force.

The form shown by Figs. 5 and 6 utilizes planetary gears for transmitting rotation from the prime mover to the feeler shaft. In this form the motor 24, its supporting fixture 28, its armature shaft 29, and its driving pinion 30 are substantially the same as in the form shown by Figs. 3 and 4. Pinion 30, however, meshes with planetary gears 41, 41, and these in turn mesh with an internal gear 42. Gear 42 is the counterbalancing abutment with which the planetary gears coöperate to impart rotation to feeler shaft 14. Shafts 14 and 29 meet at or near the right-hand (Fig. 6) face of pinion 30, and they may have some suitable slip connection to keep them in coaxial relation. A two-armed structure 43 is affixed to shaft 14 and is provided with studs 44 on which the planetary gears are mounted. As the driving pinion 30 turns in the direction indicated by an arrow in Fig. 5, the planetary gears traverse the internal gear in the same direction and thus carry the two-armed structure 43 and with it the feeler shaft 14 likewise in the direction of the said arrow. There is, however, a tendency on the part of the planetary gears to turn the internal gear in the opposite direction, but this tendency is counterbalanced by a pendulum rod 45 and weight 46 fastened to the back of the internal gear. An indicating pointer 47 is carried by the internal gear and coöperates with a scale element 48.

In all the modifications thus far described the counterbalancing elements are movable about the axis of the rotary feeler. Fig. 7 illustrates a modification in which the counterbalancing movement is rectilinear. Another feature common to all the modifications hitherto described is that a pendulum weight is the means for providing the cumulative counterbalancing force. This form is like that shown by Figs. 1 and 2 in that the feeler shaft 14 is provided with a worm gear and the latter is driven by a worm carried by the armature shaft of the motor. The worm gear is indicated at 50, and the worm at 51. The motor is indicated at 52, and its armature shaft at 53. The gear housing 54, in this case, is fixed, whereas in the form shown by Figs. 1 and 2 it is capable of turning about the feeler shaft. Worm 51 and shaft 53 are capable of movement lengthwise of their axis, and motor 52 partakes of such motion. For this reason the motor is mounted upon anti-friction rollers 55, and the latter are arranged to roll upon a base 56. A helical tension spring 57 is connected to the motor in such manner that its force tends to move the motor from right to left. As the motor rotates the worm to drive the feeler in the direction indicated by an arrow, there is always a tendency for the worm to force itself from left to right, on account of the reactive force of the viscous substance on the feeler. The movement of the worm, armature shaft and motor from left to right is opposed by the spring and is arrested as soon as the spring has been extended sufficiently to counterbalance the reactive force of the viscous substance.

The left-hand end of the armature shaft abuts against an indicating pointer 58. This pointer is mounted upon a pivot pin 59 and is arranged to coöperate with a scale 60. A light spring 61 bears against the pointer to keep the latter in contact with the armature shaft.

The indicating mechanism in all the forms shown is especially well adapted to be used in the manufacture of paper stock, to indicate the fineness of division viscosity and general condition of the latter, and it is for this reason that it is shown in combination with a "beating machine." The beating machine, as shown by Fig. 8, comprises, in addition to the tub or container 10, a midfeather 62, a rotary shaft 63, a cylindric beater 64 carried by said shaft, and a backfall 65. The beater has radially disposed blades or paddles 66 on its periphery, and, in practice, would be driven so as to cause the paper stock to flow in the direction indicated by arrows.

In Fig. 8 the feeler is arranged so that its axis is transverse to the direction of flow, and the feeler fingers 13 are disposed in radial relation, though in different planes. In the latter respect the feeler fingers collectively are adapted to encounter the average degree of resistance from the paper stock, as the consistency of the stock is not necessarily the same near the wall and midfeather of the tub, as it is in the middle of the stream.

In the practical use of a beating machine the beater is driven, preferably at a constant speed, to propel the stock over the backfall, down which it gravitates, the beater and backfall, conjointly, thus causing the stock to flow as stated. This operation is continued until the consistency of the stock becomes uniform throughout, and of the desired degree, the indicating mechanism hereinbefore described being intended to indicate the degree as the operation continues.

The phrase "driving means" as hereinafter used, is intended to have a broad meaning. In other words, it may, though not necessarily in all cases, include the prime mover, but would, in any case, include one or more of the elements that transmit motion from the prime mover to the feeler.

I claim:

1. Viscosity-indicating mechanism for beater stock comprising a rotary feeler consisting of a shaft arranged above the stock and having a series of members to move successively through the stock to a point thereabove, means for driving said feeler at a predetermined speed to cause such movement of said members, said means being movable in response to the reaction of such stock upon said feeler, means arranged to act upon said driving means with gradually increasing force to counterbalance such reaction, said counterbalancing means being adapted to return said driving means to a normal position as the force of such reaction diminishes, and an indicating element arranged to have indicating movement imparted thereto by counterbalancing movement of said driving means.

2. Viscosity-indicating mechanism comprising a rotary feeler movable about a fixed axis and having a series of members to move through the stock to a point thereabove, transmission means adapted to transmit rotation from a prime mover to said feeler to cause such movement of said members, an element of said means being movable, otherwise than in a driving capacity, in response to the reaction of such substance upon said feeler, means arranged to act upon said movable element to counterbalance such reaction, said counterbalancing means being adapted to return said movable element to a normal position as the force of such reaction diminishes, and an indicating element arranged to have indicating movement imparted to it by counterbalancing movement of said movable element.

3. Viscosity-indicating mechanism comprising a beating machine adapted to contain viscous paper-stock, in combination with a rotary feeler arranged with its axis transverse to the path of the paper-stock and having a plurality of radially disposed feeler-fingers arranged along the feeler to traverse separate paths through the paper-stock, means arranged to drive said feeler about said axis, an indicating element arranged to be moved in one direction by the reactive force of said paper-stock upon said feeler fingers, and means arranged to exert a counterbalancing force upon said indicating element in opposition to such reactive force of the viscous substance.

In testimony whereof I have affixed my signature.

JOHN G. CALLAN.